UNITED STATES PATENT OFFICE.

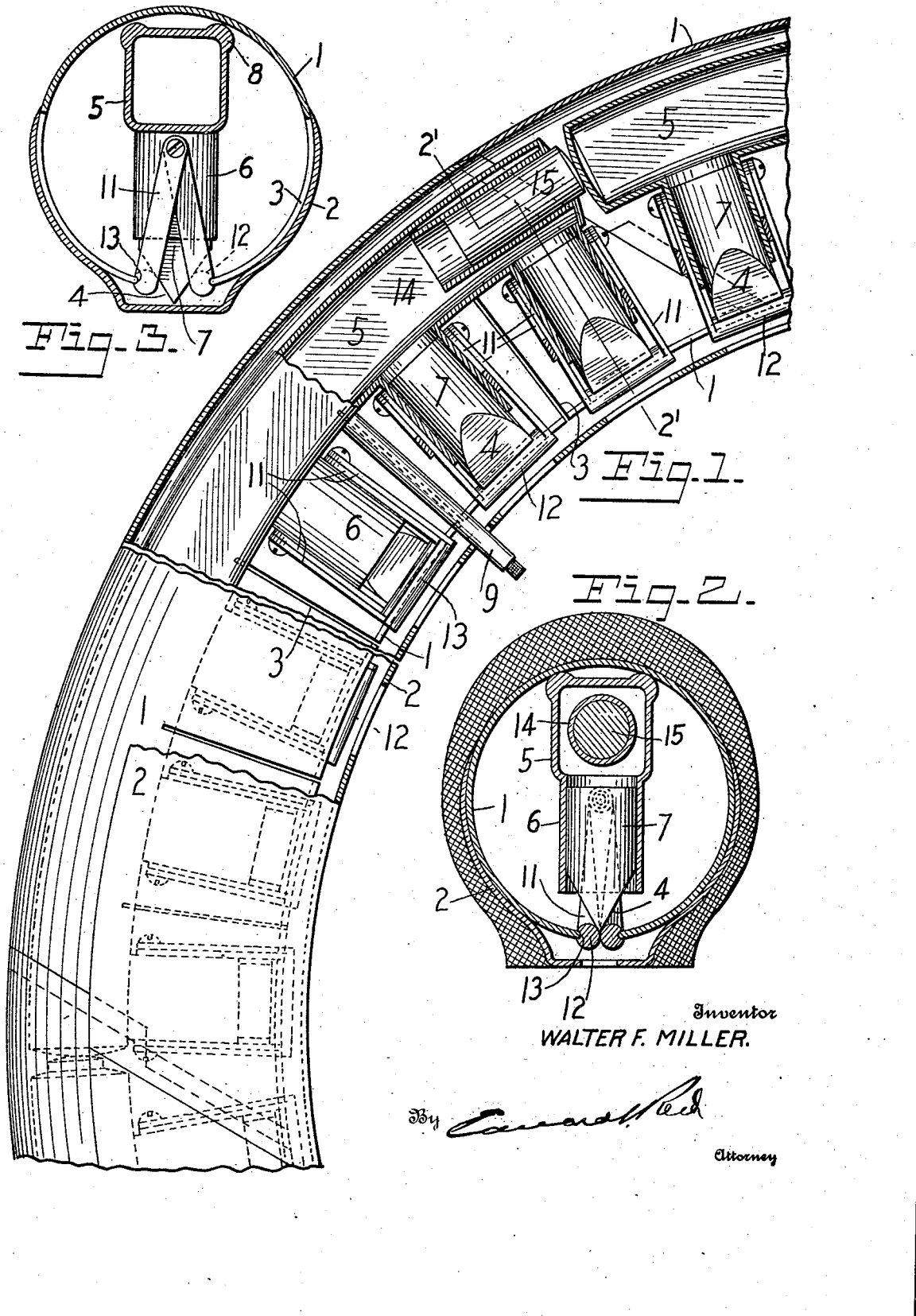
W. F. MILLER.
EXPANSIBLE CORE FOR CURING AUTOMOBILE TIRES AND THE LIKE.
APPLICATION FILED JUNE 24, 1921.
1,420,490.
Patented June 20, 1922.
Inventor
WALTER F. MILLER.

WALTER F. MILLER, OF DAYTON, OHIO.

EXPANSIBLE CORE FOR CURING AUTOMOBILE TIRES AND THE LIKE.

1,420,490.	Specification of Letters Patent.	Patented June 20, 1922.

Application filed June 24, 1921. Serial No. 479,994.

*To all whom it may concern:*

Be it known that I, WALTER F. MILLER, a citizen of the United States, residing at Dayton, in the county of Montgomery and State of Ohio, have invented certain new and useful Improvements in Expansible Cores for Curing Automobile Tires and the like, of which the following is a specification, reference being had therein to the accompanying drawing.

This invention relates to expansible cores for curing automobile tires and the like.

In the manufacture of automobile tires, and particularly with the better class of tires, it is desirable that pressure should be applied to the tire during the curing or vulcanizing process. Heretofore this has been accomplished by inserting in the tire a tube of flexible material, commonly known as an air bag, which is inflated by steam, or air, to apply the desired presure to the tire, it being understood that the tire during the curing process is placed in a mold which will prevent it from being stretched by the pressure exerted on the interior thereof. These air bags are short lived and because of their expensive character they add a very substantial amount to the cost of manufacturing each tire. It has been proposed to form the air bag of metal so constructed that it will expand under steam pressure, but much difficulty has been experienced in constructing a bag of this kind which would have the necessary expansion throughout its length and would be otherwise practical. In so far as I am informed no such metallic air bag has gone into commercial use.

One object of the present invention is to provide a metallic core with mechanical means for expanding the same and causing it to exert the desired pressure on all parts of the tire.

A further object of the invention is to provide such an expansible core, the inner portion of which will be extensible so as to permit the free and uniform expansion of the core throughout its length.

A further object of the invention is to provide means for maintaining the several parts of an annular core in their proper relative positions during the expansion thereof.

Other objects of the invention will appear as the device is described in detail.

In the accompanying drawings Fig. 1 is a side elevation, partly in section, of a portion of a core embodying my invention; Fig. 2 is a transverse sectional view taken on the line 2—2 of Fig. 1; and Fig. 3 is a transverse sectional view taken on the line 3—3 of Fig. 1, showing the core expanded.

In carrying out my invention, I provide a metallic casing of such a size and shape that it will fit within the tire which is to be cured. When the core is used for curing new tires, in the course of manufacture it is annular in form and is preferably made up of a plurality of sections, each independent of the other and adapted to be so connected and arranged that the annular core may be collapsed or removed section by section. If the core is used for repair purposes, or curing, or vulcanizing, a relatively small portion of the tire, the core may consist of a single segmental section and, if desired, one of the sections of an annular core may be used for this purpose. The casing is so constructed that it will expand and I have provided mechanical means for acting on the casing to expand the same and cause it to press against the tire.

The core may take various forms and in the present drawings, I have shown the same as comprising a main casing 1, substantially circular in cross section and so constructed that it will expand freely. Preferably, it is divided longitudinally along one side thereof and the line of division may be arranged in a plane extending between the beads of the tire. It is desirable that the expanding force should be applied to the casing at a point above the beads and to accomplish this and at the same time facilitate the manufacture of the core, I have, as above explained, made the main casing circular in cross section, and have provided a supplemental casing 2 extending about the inner portion of the main casing and shaped to fit between the beads of the tire. The lateral edges of this supplemental casing extend upwardly above the central line of the main casing so that it will be retained thereon and these edges are tapered off toward the wall of the main casing so that they will not form a shoulder or depression on the inner surface of the tire. It will be apparent that when the edges of the main casing are separated to expand the casing the side walls of the supplemental casing will also be expanded, thus causing pressure to be exerted upon the beads, Ordinarily sufficient pressure will be applied to the beads with the supplemental casing constructed as shown, but obviously the two side portions of this supplemental casing may be so connected one with the other as to permit a further expansion should this be thought desirable.

In order that the casing may expand freely and uniformly throughout its length I have so constructed the main casing that the inner portion thereof is extensible, thus permitting a slight straightening action of the segmental section of the core. In the present construction this is accomplished by forming in the inner portion of the main casing a series of transverse slits 3 which may extend at any suitable angle to the line of division and which, in the present instance are arranged substantially radially and extend from the edges of the side walls of the casing outwardly to a point near and, in the present instance, slightly beyond the longitudinal center line of the casing. These slits divide the edge portions of the main casing into a plurality of sections, the sections of one edge being arranged opposite the corresponding sections of the other edge. The side walls of the supplemental casing 2 which fit snugly about the outer surface of the main casing extend outwardly beyond the ends of the slits 3 and close these slits so as to prevent the passage of the vulcanizing steam through the same.

The mechanical expanding device by means of which the casing is expanded and caused to exert the desired pressure on the tire may take various forms and may be arranged in various positions with relation to the casing. The character and location of the expanding device may be determined in a large measure by the character of the casing. In the present construction I have located the expanding device within the main casing and have shown the same as comprising a mechanically operated part, or parts, arranged to act upon the edges, that is, those portions of the casing adjacent to the line of division, of the casing to separate the same. As here shown, the part, or parts which act on the edges of the casing are in the form of wedge shaped members 4, having their tapered edges arranged to enter the space between the edges of the casing, but it will be understood that it is not necessary that the expanding device or wedge enter the space between the edges of the casing, but only that it act on those portions of the casing adjacent to the line of division to force the same apart. Any suitable means may be provided for actuating the members which act upon the edges of the casing but in the present core I have utilized a fluid operated device and to this end I have shown a fluid receptacle 5 arranged within and extending lengthwise of the core, this receptacle having its ends tightly closed to provide an air tight chamber. The fluid receptacle 5 has secured thereto and preferably formed integral therewith a series of cylinders 6 arranged substantially radially of the casing and in open communication with the air chamber of the receptacle 5. Preferably there is one of these cylinders for each of the sections into which the edge of the casing is divided and mounted within each cylinder is a piston 7 connected with, and in the present instance formed integral with, a wedge shaped member 4. The action of the expanding device on the edges of the casing will expand the same and cause it to press against the tire throughout its circumference. If desired, however, a part may be provided to engage the outer portion of the casing and press the same against the tire, and as here shown the expanding device has a part arranged to engage and to be pressed against the outer portion of the casing by the action of the piston and the wedge shaped member 4, and preferably the receptacle 5 is caused to so engage the outer portion of the casing. To divide the pressure and properly apply the same to the casing, I may provide the receptacle 5 with outwardly extending projections 8 arranged on opposite sides of a central line extending between the edges of the casing. Fluid under pressure may be admitted to the receptacle 5 in any suitable manner, as by means of an inlet tube 9 connected with the receptacle and extending inwardly between the edges of the casing to a point where it may be connected with a source of supply for air or other fluid under pressure. It will be apparent, therefore, that when the air under pressure is admitted to the air chamber it will act upon the several pistons 7 tending to force the same outwardly, thus forcing the wedge shaped members between the edges of the casing and expanding the latter. The resistance offered to the movement of the pistons, by the contact of the wedges with the edges of the casing, will force the air receptacle 5 outwardly and cause it to exert pressure on the outer portion of the casing. As the movement of the wedge is limited it will be apparent that any desired pressure may be applied to the outer portion of the casing and that this may be controlled by the fluid pressure within the receptacle 5.

To prevent any tendency of the wedge to distort the edge portions of the casing or to improperly expand the latter I have provided means for guiding the edges of the casing in their movement and, as here shown, I have pivotally connected links 11 with the respective edges of the casing and with the cylinder 6 so that the edges of the casing will be caused to move in the arc of a circle described about the pivotal connection of the links with the cylinder. In the present instance there are two pairs of links 11 extending between each cylinder and the adjacent sections of the casing, and I have connected the ends of the links, each pair by means of a rod, or head, 12, which is provided in one side with a recess 13 to receive the edge of the casing. In the operation of the device the wedge engages the two heads 12 instead of directly engaging the edges of the casing.

The expansion of an annular core of this type results in an increase in the circumference thereof and the sections of which such an annular core is composed will have a certain movement relatively one to the other. In order to equalize this movement and cause each section to be properly spaced from the adjacent sections I have provided in one end of each core section a device arranged to engage the end of the other section to force the two sections apart. As here shown, I have mounted a cylinder 14 in the end of the fluid receptacle 5 and in open communication with said receptacle. Mounted in this cylinder 14 is a piston 15, which when fluid under pressure is admitted to the receptacle, will be forced outwardly from the cylinder 14 into engagement with the end of the fluid receptacle 5 of the adjacent core section, thus tending to force the two sections of the core apart. The joint between the two sections is bridged by overlapping end portions, or flaps, carried by the sections and these are of sufficient length to bridge any opening which may be formed between the two sections by their relative movements.

The steam, or other fluid used, for curing the tire may be admitted to the interior of the core in any suitable manner, as by providing the supplemental casing with an opening, or openings, which may communicate either with the steam chamber in the mold or with a separate supply of steam.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In the device of the character described, a segmental casing formed wholly of resilient material, substantially circular in cross section, adapted to fit within a tire and divided longitudinally along one side thereof, and mechanical means to positively expand said casing.

2. In the device of the character described, a casing of resilient material, substantially circular in cross section, adapted to fit within a tire and divided longitudinally along one side thereof, and mechanical means arranged within said casing and acting thereon to positively expand the same 3. In the device of the character described a casing of resilient material, substantially circular in cross section, adapted to fit within a tire and divided longitudinally along one side thereof, and means acting on the edges of said casing, along the line of said division to positively force said edges apart.

4. In a device of the character described, a casing of resilient material, substantially circular in cross section, adapted to fit within a tire and divided longitudinally along one side thereof, and means for acting on the edges of said casing to positively move said edges in arcs of a circular described upon a center substantially coincident with the center of said casing.

5. In a device of character described a casing of resilient material, substantially circular in cross section, adapted to fit within a tire and divided longitudinally along one side thereof, an expansible device comprising a part moveable into the space between the edges of said casing along said line of division, and means for positively actuating said part.

6. In a device of the character described, an expansible casing substantially circular in cross section, adapted to fit within a tire, and divided longitudinally along one side thereof, and an expanding device comprising a wedge shape part to act on the edges of said casing along the line of said division to expand said casing and means to positively actuate said wedge shaped part.

7. In a device of the character described, an expansible casing substantially circular in cross section, adapted to fit within a tire, and divided longitudinally along one side thereof, and an expanding device arranged within said casing and comprising a wedge shaped part to act on the edges of said casing along the line of said division to expand said casing and means to positively actuate said wedge shaped part.

8. An expansible core for vulcanizing tires and the like, comprising a tubular casing shaped to fit within a tire, divided longitudinally along one side thereof only and having opposed edges, and means acting on said edges to exert positive outward pressure on all portions of said casing.

9. An expansible core for vulcanizing tires and the like, comprising a tubular casing shaped to fit within a tire, divided longitudinally along one side thereof only, and having substantially parallel edges arranged to lie within the tire, and means acting positively on said edges to force the same apart and expand said casing.

10. An expansible core for vulcanizing tires and the like comprising a tubular casing shaped to fit within a tire and divided longitudinally along one side thereof, and means acting positively on the edges of said casing, adjacent to said line of division, to force the same apart and press said casing against that portion of the tire remote from the edges of said casing.

11. An expansible core for vulcanizing tires and the like comprising a tubular casing shaped to fit within a tire and divided longitudinally along one side thereof only, and an expanding device comprising a wedge shaped part to act on the edges of said casing adjacent to said line of division to force the same apart and means to positively actuate said wedge shaped part.

12. An expansible core for vulcanizing tires and the like comprising a tubular casing shaped to fit within a tire and divided longitudinally along one side thereof only, and an expanding device mounted within said casing and comprising a wedge shaped part to enter the space between the edges of said casing, along said line of division, and force the same apart and means to positively actuate said wedge shaped part.

13. In a device of the character described, an expansible casing adapted to fit within a tire and divided longitudinally along one side thereof, and means acting on the edges of said casing, along the line of division to force the same apart and to exert pressure on that portion of said casing opposite the line of division.

14. In a device of the character described, an expansible casing adapted to fit within a tire and divided longitudinally along one edge thereof, an expanding device comprising a part to act on the edges of said casing to separate the same, and a part to act on that portion of said casing opposite the line of said division.

15. In a device of the character described, an expansible casing adapted to fit within a tire and divided longitudinally along one side thereof, an expanding device comprising a part to act on the edges of said casing to separate the same, and another part arranged to be pressed against that portion of said casing opposite the line of division by the resistance offered to the movement of the first mentioned part.

16. In a device of the character described, an expansible casing adapted to fit within a tire and divided longitudinally along one side thereof, and an expanding device comprising a structure arranged to engage a portion of said casing remote from the edges thereof and having a fluid chamber, a part mounted on said structure and arranged to be forced against said edges by fluid pressure in said chamber.

17. In a device of the character described a tubular casing of resilient material shaped to fit within a tire, and divided longitudinally along one side thereof, an expanding device comprising a wedge shaped part, and positively operated means to force said part between the edges of said casing.

18. In a device of the character described, an expansible casing adapted to fit within a tire and divided longitudinally along one side thereof, and an expanding device comprising a wedge shaped part, and means to force said part between the edges of said casing, said expanding device also comprising a part arranged to be forced against that portion of said casing opposite said line of division by the contact of said wedge with the edges of the casing.

19. In a device of the character described, an expansible casing adapted to fit within a tire and divided longitudinally along one side thereof, an expanding device mounted within said casing and comprising relatively movable parts to engage respectively those portions of said casing adjacent to the beads and tread of the tire and exert positive pressure thereon.

20. In a device of the character described, an expansible casing adapted to fit within a tire and divided longitudinally along one side thereof, and an expanding device arranged within said casing and comprising an outwardly moving wedge shaped part arranged to enter the space between the edges of said casing, and means to positively actuate said part.

21. In a device of the character described, an expansible casing adapted to fit within a tire and divided longitudinally along one side thereof, a wedge arranged to enter the space between the edges of said casing, means for actuating said wedge, and means for controlling the movement of the edges of said casing.

22. In a device of the character described, an expansible casing adapted to fit within a tire and divided longitudinally along one side thereof, a part acting on the edges of said casing to separate the same, and fluid operated means for actuating said part.

23. In a device of the character described, an expansible casing adapted to fit within a tire and divided longitudinally along one side thereof, a cylinder, a piston mounted in said cylinder, a wedge shaped part connected with said piston, and means for admitting fluid under pressure to said cylinder.

24. In a device of the character described, an expansible casing adapted to fit within a tire and divided longitudinally along one side thereof, a receptacle for fluid under pressure arranged within said casing, a cylinder connected with said receptacle, a piston mounted in said cylinder, and means actuated by said piston to expand said casing and cause the same to exert pressure against the tire.

25. In a device of the character described, an expansible casing adapted to fit within a tire and divided longitudinally along one side thereof, a receptacle for fluid under pressure arranged within said casing, a cylinder connected with said receptacle, a piston mounted in said cylinder, and a wedge shaped member connected with said piston and arranged to enter the space between the edges of said casing.

26. In a device of the character described, an expansible casing adapted to fit within a tire and divided longitudinally along one side thereof, a receptacle for fluid under pressure arranged within said casing and adapted to bear against that side of said casing opposite the line of said division, a cylinder carried by and communicating with said receptacle, a piston mounted in said cylinder, and a wedge shaped member connected with said piston and arranged to enter the space between the edges of said casing.

27. In a device of the character described, an expansible casing adapted to fit within a tire and divided longitudinally along one side thereof, a receptacle for fluid under pressure arranged within said casing, a plurality of cylinders carried by and communicating with said receptacle, a piston mounted in each of said cylinders, and wedge shaped members connected with the respective pistons and arranged to enter the space between the edges of said casing.

28. In a device of the character described, an expansible casing adapted to fit within a tire and divided longitudinally along one edge thereof, an expanding device arranged within said casing and comprising a part adapted to act on the edges of said casing to separate the same, and links connected with the edges of said casing and with a relatively fixed part of said expanding device.

29. In a device of the character described, an expansible casing adapted to fit within a tire and divided longitudinally along one side thereof, a receptacle for fluid under pressure arranged within said casing, a cylinder carried by and communicating with said receptacle, a piston mounted in said cylinder, a wedge shaped member connected with said piston and arranged to enter the space between the edges of said casing, and two pairs of links each pivotally connected at one end with said cylinder and connected at their other ends with the respective edges of said casing.

30. In a device of the character described, an expansible casing adapted to fit within a tire and divided longitudinally along one side thereof, a receptacle for fluid under pressure arranged within said casing, a cylinder carried by and communicating with said receptacle, a piston mounted in said cylinder, a wedge shaped member connected with said piston and arranged to enter the space between the edges of said casing, two pairs of links pivotally mounted on said cylinder, the links of each pair being connected at their outer ends by a bar, and said bar having a recess to receive the adjacent edge of said casing.

31. In a core of the character described, a segmental tubular casing comprising a single piece of resilient metal shaped to fit within a tire and having a plurality of transverse slots in one side thereof, and means to expand said casing.

32. In a core of the character described, a segmental tubular casing shaped to fit within a tire, divided longitudinally along one side thereof and having a series of slots extending transversely thereof through said line of division, and means to apply pressure to said casing to expand the same.

33. In a device of the character described, a segmental tubular casing formed wholly of resilient sheet metal, adapted to fit within a tire, and divided longitudinally along one side thereof, said casing having a series of transverse slits on both sides of the line of said division to divide the edges thereof into a plurality of sections, whereby said casing is free to expand in all directions, and means for applying pressure to said casing to expand the same.

34. In a device of the character described, a resilient casing adapted to fit within a tire and divided longitudinally along one side thereof, said casing having a series of transverse slits on both sides of the line of said division to divide the edges thereof into a plurality of sections which are integral one with the other at those ends remote from said line of division, and means acting on said edges to force them apart.

35. In a device of the character described, a resilient casing adapted to fit within a tire and divided longitudinally along one side thereof, said casing having a series of transverse slits on both sides of the line of said division to divide the edges thereof into a plurality of sections which are integral one with the other at those ends remote from said line of division, and means acting on said edges to force them apart and to press the opposite portion of said casing against the tire.

36. In a device of the character described, a resilient casing adapted to fit within a tire and divided longitudinally along one side thereof, said casing having a series of transverse slits on both sides of the line of said division to divide the edges thereof into a plurality of sections which are integral one with the other at those ends remote from said line of division, an expanding device arranged within said casing and comprising a plurality of parts arranged to engage the respective sections of said edges to separate the same, and means to actuate said parts.

37. In a device of the character described, a casing adapted to fit within a tire and divided longitudinally along one side thereof, said casing having substantially radial slits on both sides of the line of said division to divide the edges thereof into a plurality of sections, a receptacle arranged within said casing to receive fluid under pressure and adapted to bear against that portion of said casing opposite said line of division, cylinders carried by and communicating with said receptacle, pistons in said cylinders, and a plurality of wedge shaped members arranged to engage the respective sections of said edges and operatively connected with said pistons.

38. In a device of the character described, a main casing adapted to fit within a tire and divided longitudinally along its inner side, a supplemental casing embracing the inner portion of said main casing and fitting between the beads of said tire, and means for expanding said casings.

39. In a device of the character described, a main casing adapted to fit within a tire and divided longitudinally along its inner edge, a supplemental casing embracing the inner portion of said main casing and shaped to fit within the beads of the tire, and an expanding device arranged within said main casing to act upon the edges thereof to expand said casings.

40. In a device of the character described, a main casing adapted to fit within a tire and divided longitudinally along one side thereof, said casing having substantially radial slits on both sides of the line of said division to divide the edges thereof into a plurality of sections, a supplemental casing embracing the inner portion of said main casing, closing said slits and shaped to fit within the beads of the tire, and an expanding device arranged within said main casing and having parts to act upon the several sections thereof to expand said casings.

41. In a device of the character described, an annular core comprising a series of segmental casings arranged end to end, each of said casings being expansible, means for expanding said casings, and means for imparting relative longitudinal movement to said casings.

42. In a device of the character described, an annular core comprising a plurality of segmental casings arranged end to end, each of said casings being divided longitudinally along one side thereof, a receptacle arranged within each of said casings, to receive fluid under pressure, means actuated by the fluid in said receptacle to expand said casing, a cylinder mounted in and extending lengthwise of the fluid receptacle of each casing, said cylinder being in open communication with said receptacle, and a piston mounted in said cylinder and arranged to engage a part of the adjacent casing.

43. A circular core of the character described comprising a plurality of segmental casings formed of resilient material, substantially circular in cross section, and adapted to fit within a tire, and to be arranged end to end to form a complete annulus, each section being divided longitudinally along one side thereof, and a plurality of mechanical devices arranged within each casing and acting thereon to expand the same.

In testimony whereof, I affix my signature hereto.

WALTER F. MILLER.